United States Patent [19]

Schloeman

[11] 4,220,993
[45] Sep. 2, 1980

[54] ENGINE THROTTLE CONTROL SYSTEM

[75] Inventor: Robert W. Schloeman, Phoenix, Ariz.

[73] Assignee: Sperry Corporation, New York, N.Y.

[21] Appl. No.: 942,518

[22] Filed: Sep. 15, 1978

[51] Int. Cl.² ............... G06G 7/66; G05D 1/00; B64C 13/16

[52] U.S. Cl. .................. 364/431; 60/39.15; 60/39.28 R; 244/178; 244/194; 364/105

[58] Field of Search ............ 364/105, 431, 424, 116; 244/178, 182, 197, 192, 194, 195, 191; 318/621, 622, 610, 616, 624, 632, 580, 611; 60/39.15, 39.28 R

[56] References Cited

U.S. PATENT DOCUMENTS

| | | | |
|---|---|---|---|
| 3,555,391 | 1/1971 | Younkin | 318/621 X |
| 3,691,356 | 9/1972 | Miller | 244/194 X |
| 3,813,063 | 5/1974 | Martin | 244/178 X |
| 3,852,956 | 12/1974 | Martin | 364/105 X |
| 3,981,442 | 9/1976 | Smith | 244/182 X |

Primary Examiner—Joseph F. Ruggiero
Attorney, Agent, or Firm—Howard P. Terry

[57] ABSTRACT

An engine auto throttle control system is disclosed wherein the stability of the high gain control loop is provided by means of complemented EPR feedback. Furthermore, the multi-engine auto throttle control system of this invention generates a stable engine thrust trim command by means of a voter mechanism coupled to the respective engines EPR signals for providing a unique commanded EPR signal and by means of EPR error feedback means coupled to the commanded EPR signal for providing respective actuator signals for each of the respective engine throttle controls for trimming the engines to the same EPR value. In addition, engine overboost protection is provided to each engine individually such that all engines are controlled to a reference maximum limit.

9 Claims, 4 Drawing Figures

ENGINE THROTTLE CONTROL SYSTEM

BACKGROUND OF THE INVENTION

1. Field of the Invention

The present invention relates to auto throttle control systems or thrust management systems and, more particularly, to a multi-engine thrust trim system usable over the full operating envelope of the engine.

2. Description of the Prior Art

Prior art auto throttle control systems are known in which the auto throttle included a single closed loop on engine pressure ratio (EPR), that is, on the engine with the highest EPR as a reference feedback for the other engines. Accordingly, in these previous systems, no trim function was provided. In addition, it is known that the engine characteristics substantially lag the throttle control such that a stable high gain auto throttle type control system is difficult.

Accordingly, there is a need to provide a multi-engine auto throttle control system which exhibits a stable trim command over the engine operating envelope and which provides a stable high gain EPR control loop. Furthermore, it is desirous to include an engine overboost protection means in the system.

SUMMARY OF THE INVENTION

In accordance with the present invention, a multi-engine auto throttle trim control system is provided which is usable over the full operating envelope of the engines. The stable trim control command is generated in accordance with this system and with respect to an engine status indicator signal, e.g., EPR, by means of a mid value voter mechanism and EPR error feedback terms. Engine overboost protection is provided to each engine individually, resulting in all engines being controlled to operating conditions below the maximum limit constraints. In addition, the stability of the high gain control loop is provided by means of complemented EPR feedback.

Specifically, the multi-engine throttle control system of this invention comprises means responsive to each of the respective engines for producing respective engine status indicator signals, on some engines identified as engine pressure ratio (EPR), and means responsive to the rate of change of the respective engine throttle fuel controller position, on some engines identified as engine cross shaft angle or (CSA), for deriving a modified derived signal of said engine status indicator (EPR) signal in response to the CSA rate, which when combined with said respective engine status indicator signal forms a lag compensated signal, or a complemented EPR signal, to stabilize the marginal engine EPR trim control loop. The complemented EPR signal is coupled to the engine automatic throttle position control actuator in feedback fashion.

More specifically, the multi-engine auto throttle trim control system of this invention includes series coupled manual and respective automatic throttle position control actuator inputs to the respective engines and comprises voting means responsive to the respective engine status indicator signals for producing a mid value voted engine indicator command or target signal, i.e., EPR command. The mid value voted engine indicator commanded signal is coupled with the respective engine status indicator signals, and more specifically, to the respective complemented EPR signals producing respective error rate signals for each engine. The respective error rate signals are respectively coupled to the mid value voted engine indicator EPR command signal and the individual respective engine status indicator signal for providing respective position control signals to each engine automatic throttle position control actuator such that all of the engines are trimmed to the same engine status indicator (EPR) value. In addition, the multi-engine auto throttle trim control system of this invention includes predictor means responsive to the respective throttle controls and automatic throttle position control actuator positions for providing a predicted signal in response to a pilot commanded manual control of the engines such that all of the engines are adjusted not to exceed a rated value.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT OF THE INVENTION

For a more complete appreciation of the invention, attention is invited to the following description of the illustrative embodiments of the invention as shown in the attached drawings.

Figure 1A:
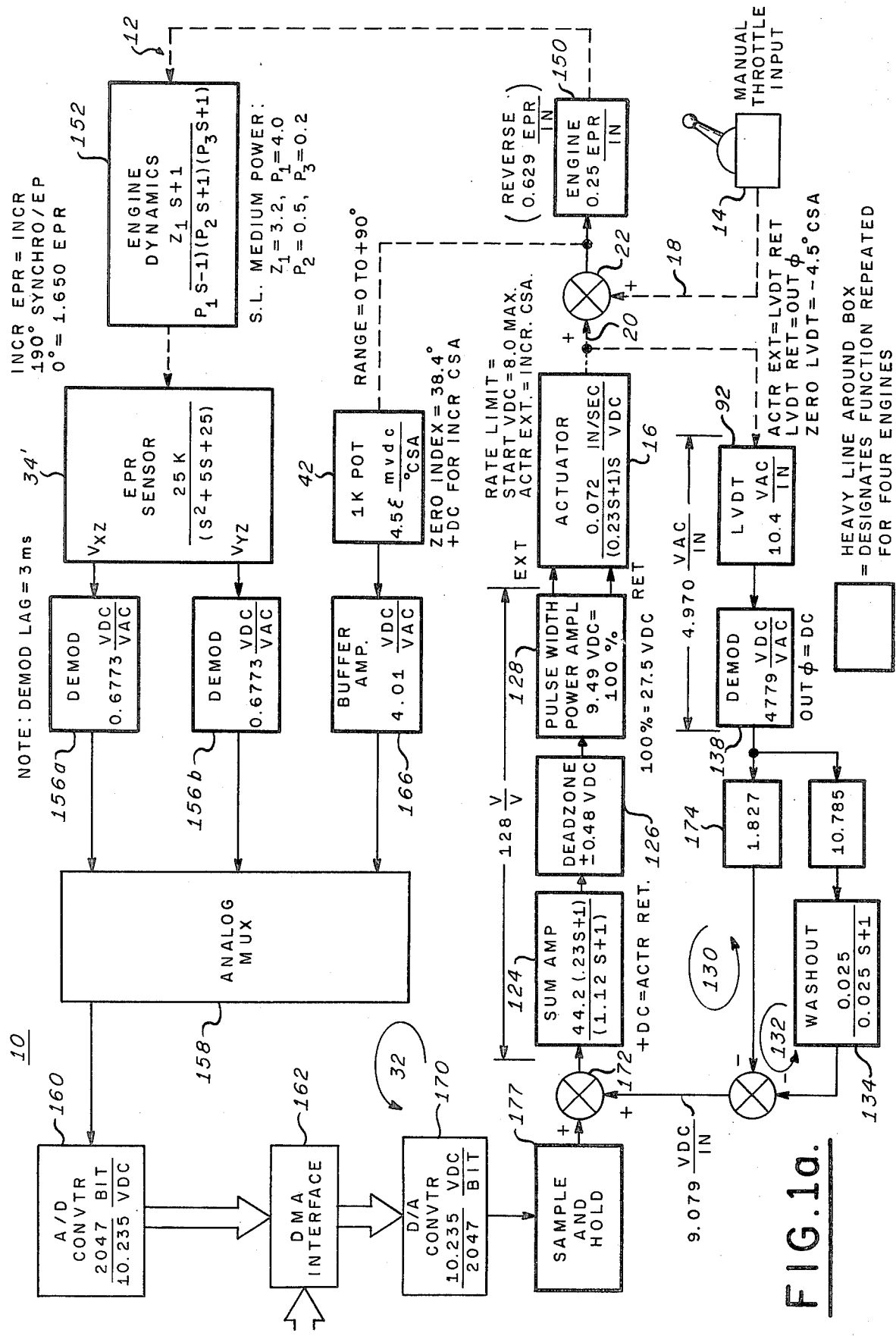
FIGS. 1A and 1B form a computational block diagram of the preferred embodiment of the present invention.
Figure 1B:
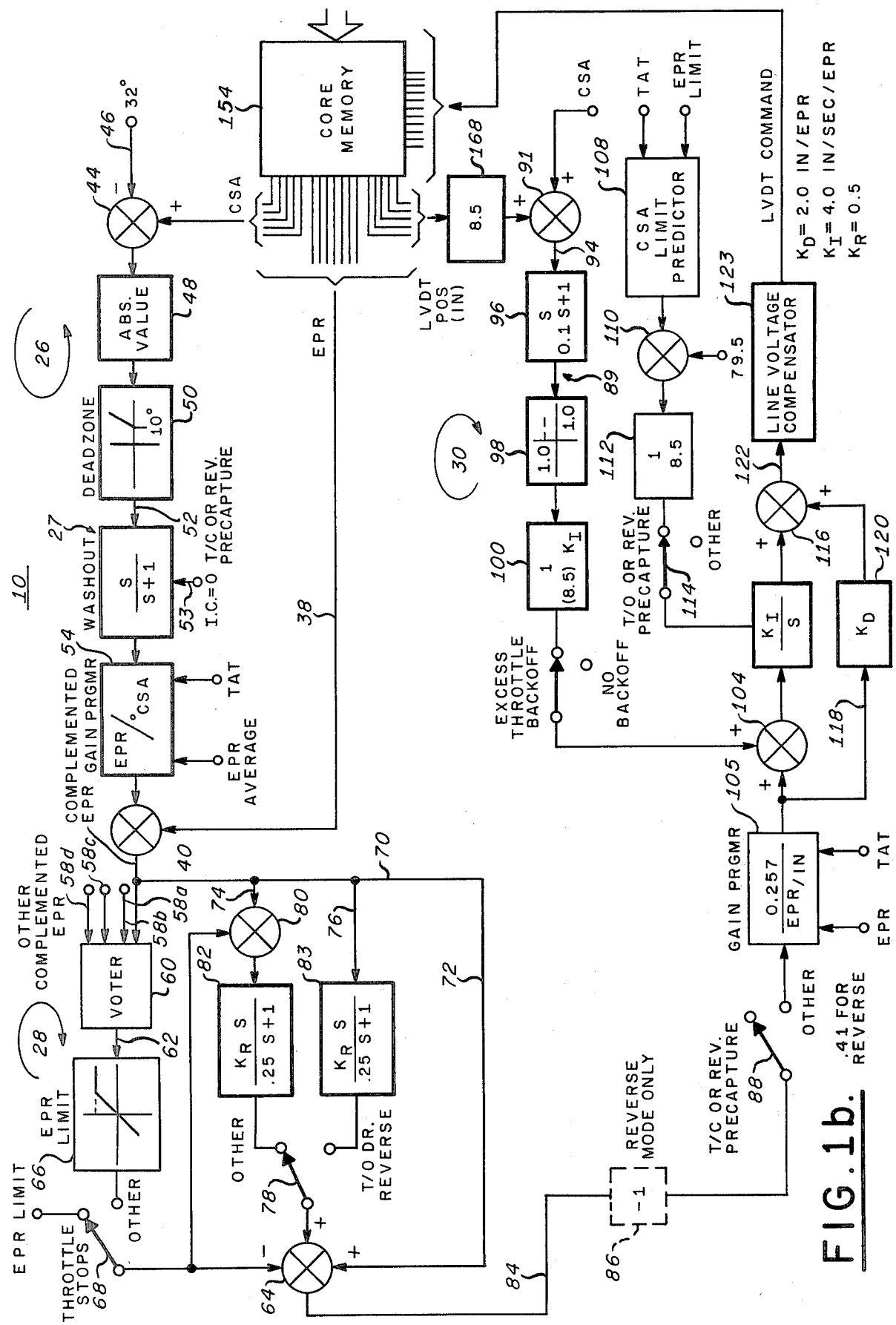
Figure 2:
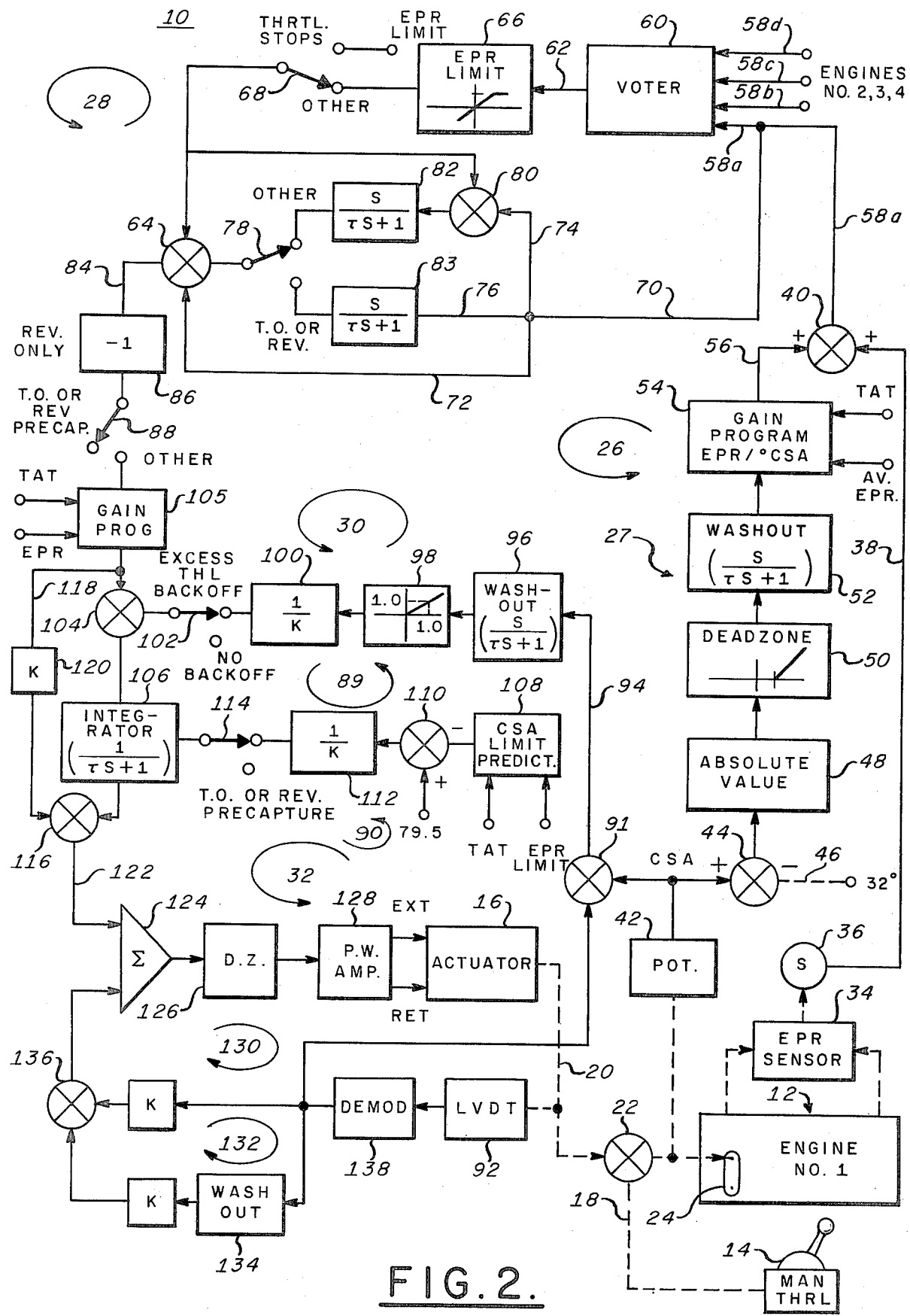
FIG. 2 is an analog block diagram of the invention.
Figure 3:
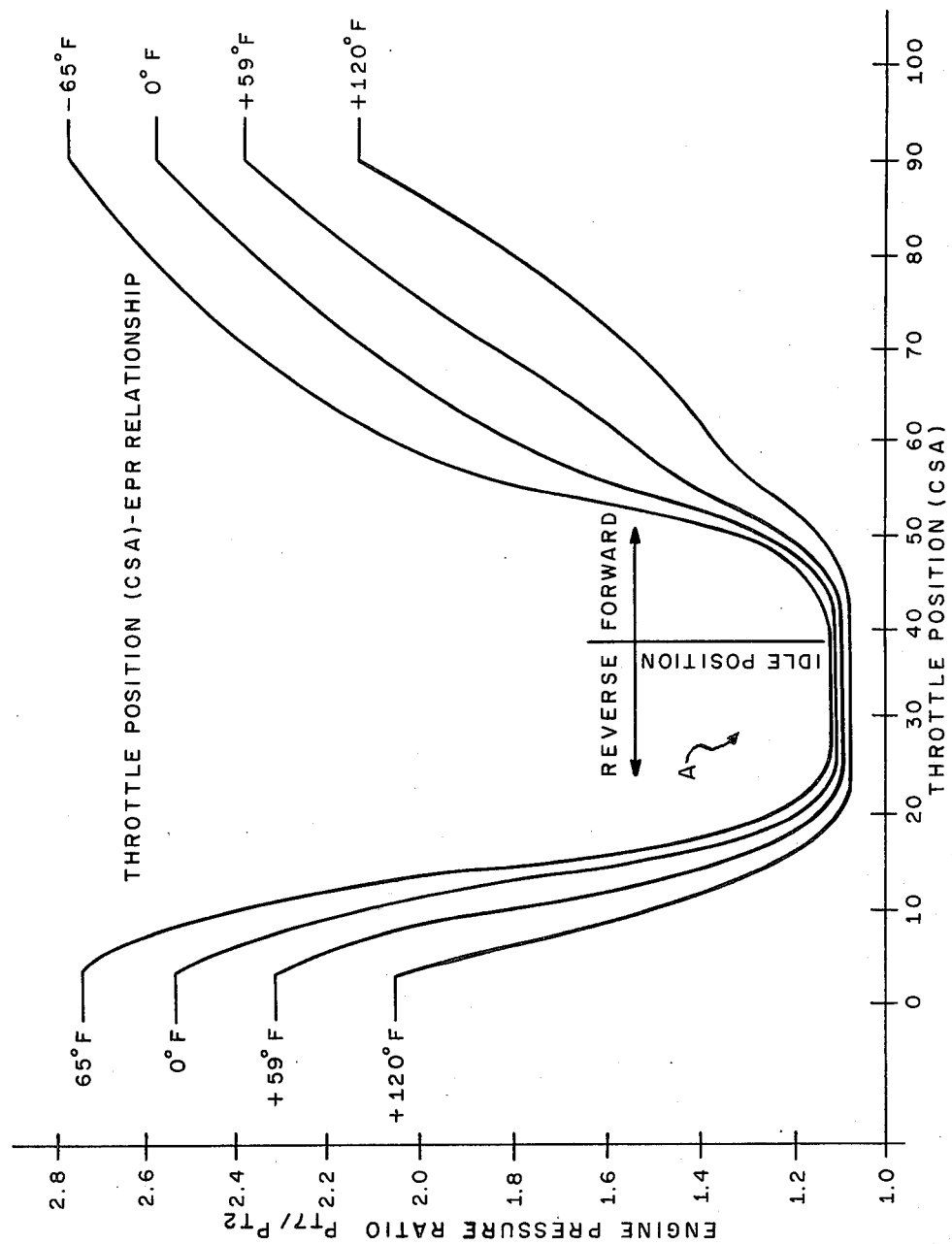
FIG. 3 schematically illustrates the relationship between the engine status indicator or characteristic signal (EPR) versus throttle fuel controller position (CSA) for a particular turbine engine, utilized in a typical preferred embodiment of this invention.

Although the preferred embodiment of the invention is illustrated in FIGS. 1A and 1B, attention is invited to the analog block diagram of FIG. 2, for initial clarity purposes. The analog block diagram of FIG. 2 illustrates a multi-engine throttle control trim system 10 of this invention shown coupled to one engine 12 of a multi-engine aircraft and its respective controls, the other engines and associated control trim system 10 components are identical and have been omitted for clarity. Specifically, the engine 12 includes series coupled manual throttle 14 and an automatic throttle position control actuator 16, whose inputs 18 and 20, respectively, are coupled through a suitable summing linkage, schematically illustrated as summing junction 22, to an engine throttle fuel control member 24. Moreover, the engine throttle control trim system 10 of this invention includes a stabilized high gain control loop provided by a complemented or lead generating feedback loop 26, responsive to an engine status indicator signal, whose output is coupled to the actuator 16. The system 10 of this invention further includes a trim command loop 28 for generating a convergent and stable control command, free of any cross coupling; loop means 30 coupled to the trim command loop 28 for providing engine overboost protection; and an automatic throttle position contol actuator feedback loop 32 coupled thereto for driving the actuator 16. The respective outputs 18 and 20 of the manual throttle 14 and the engine automatic throttle position control trim actuator 16 are series summed at summing junction 22 to form the total engine fuel controller input to the throttle fuel control 24, which for this particular aircraft engine, a Pratt and Whitney Aircraft Company JT8D-17 fan engine, is referred to as cross shaft angle (CSA). The cross shaft angle, (CSA), is related to the engine thrust via a particular engine status indicator signal, engine pressure ratio, EPR, which is defined as the pressure ($PT_7$) at an engine outlet station (7) divided by the pressure ($PT_2$) at an engine inlet station (2). The relationship of CSA and EPR of this particular engine is shown as a typical family of EPR vs. CSA curves in FIG. 3. For this particular engine, the engine throttle control system 10, is responsive to EPR, the particular engine status indicator of this engine as well as the dynamics of the particular engine. It is noted that for turbine engines of other manufacturers, the particular engine status indicator signal, the throttle fuel control and the relationship of engine status indicator signal to throttle fuel control may be different, e.g., a General Electric turbine engine status indicator signal may be the designated $N_1$ (low speed fan) control, however, the various features of novelty which characterize the instant invention are applicable thereto. Accordingly, the control system 10 of the preferred embodiment of this invention with engine pressure ratio as the status indicator signals includes an engine pressure ratio or EPR sensor 34 and an accompanying synchro 36 which provide the control system 10 with the associate EPR signal for the particular engine 12 via line 38 to a summing junction 40 of the complemented EPR feedback loop 26. For clarity purposes, the multi-engine throttle control system 10 is shown with only one engine 12, and those functions or circuits which are repeated for each engine are shown in the figures by a heavy line forming a box around the function. As it is known that the engine's characteristics exhibit multiple lags, which are significant at low power settings, and the EPR sensor 34 itself also exhibits second order response characteristics introducing additional phase shifts or lags into the system, an automatic throttle control system responsive to EPR is expected to exhibit marginal stability. In order to accommodate the inherent engine and EPR sensor lags and to stabilize the control system, the feedback loop means 26 of this invention includes complementary filter means 27 to lead compensate the lag signal of the engine. Specifically, the complementary filter means 27 includes throttle control feedback means 42, shown in this application as a potentiometer, coupled to the output of the summing junction 22 and the input of the throttle fuel control 24. The output of the potentiometer 42 is therefore indicative of the cross shaft angle and is coupled to a summing junction 44, where it is summed with a bias signal 46 to accommodate and offset the flat deadzone characteristic A of the EPR v. CSA relationship indicated in FIG. 3. Thus, the biased potentiometer output signal or CSA signal of the summing junction 44 provides the anticipation or lead generating information to the complementary filter 27. The CSA signal output of the summing junction 44 is coupled through absolute value means 48 and is series coupled to a deadzone means 50, which are also utilized to accommodate the flat-deadzone characteristic A of EPR versus cross shaft angle and to accommodate both forward and reverse thrust positions of the throttle control 24. The deadzone means 50 prevents a CSA rate signal from being generated when the fuel controller is in the region where throttle changes have no effect on EPR and hence need no complementing. The deadzone for this particular engine as shown in FIG. 3 is approximately 22° to 42° of CSA, i.e, 32°±10°. The output of the deadzone means 50, or the associated cross shaft angle signal is coupled to a washout circuit 52 which provides a modified rate signal thereof to lead compensate the lag output of the engine EPR sensor 34. The modified rate signal from the washout circuit 52 is coupled to a gain programmer 54 which converts the modified CSA rate signal to a corresponding EPR signal. That is, the gain programmer utilizes the data of FIG. 3 to adjust the CSA rate to retain a compatible relationship with EPR. The gain programmer 54 is responsive to a total air temperature (TAT) input and an average EPR input, where the gain is defined as the slope for any given point on the family of curves, to compensate for the EPR variation with temperature. The average EPR input may be determined in a number of ways, one of which is explained herein in relation to the trimming function of the invention of this control system 10. The modified derived EPR rate output signal formed by the gain programmer 54 of filter means 27 is coupled via line 56 to the summing junction 40 where the modified derived EPR rate signal and the sensor 34 EPR signal are combined to produce a complemented EPR signal of the EPR feedback loop 26 on line $58_a$. That is, the modified derived EPR signal of the complementary filter means 27 when added to the engine sensor EPR signal provides a complemented EPR signal for that particular engine to lead compensate that engine's EPR signal to the control system 10. Furthermore, the complemented EPR signal provides stability to the high gain control loop of the auto throttle trim control system of this invention. Further, it is noted that the complemented EPR feedback loop 26 provides the complemented EPR signal on line $58_a$ for engine 12 and an identical loop would be provided for each additional engine of a multi-engine aircraft, as each engine and its respective sensor have their own dynamic and gain characteristics. For example, in a four engine aircraft, illustrated herein by means of the notation in FIG. 2 regarding ENGINES #2, 3, 4, the control system 10 requires three additional complemented feedback loops similar to loop 26, one for each of the remaining engines #2, 3, 4 and the respective complemented EPR signal of each of these engines is provided on lines $58_b$, $58_c$ and $58_d$ (FIG. 2), respectively, similar to line $58_a$. The complemented EPR signal of each engine provides the stability to the control loop of the auto throttle control system 10 of this invention.

The apparatus of this invention further provides means for providing a stable trim command to the auto throttle control system. As illustrated in FIG. 2, a multi-engine aircraft auto throttle control system of this invention provides a trim command for the aircraft's engines by means of the trim command loop 28. Specifically, the complemented EPR signals of each engine of a multi-engine system are coupled to a voter mechanism 60; thus, the four engine aircraft illustrated in FIG. 2 of this invention, has lines $58_a$ through $58_d$ of the respective engines coupled to the voter 60. The voter mechanism 60 produces an output signal which is a target EPR command signal for all engines for the trim mode of operation and which is formed in response to the complemented EPR input signals of all the engines. The target EPR command is generated by the voter 60 in the following manner. The voter discards the highest and the lowest EPR signals coupled thereto via lines 58$_a$ through 58$_d$ and provides the mid value average of the remaining two input signals as the output or target EPR command. It is noted that if the EPR signals coupled to the voter are all equal, the voter provides the target EPR command by discarding the first and last signals and provides the mid value average of the remaining two equal signals. For each engine of the aircraft, but illustrated herein for engine 12 only, the output of the voter 60 is coupled via line 62 to a summing junction 64, wherein the trim command is developed. The output of the voter 60 is coupled to the summing junction 64 through a limiter 66 and a logic switch 68. The physical constraints on engine operation are manifest in a maximum EPR limit. The limiter 66 provides a means of limiting the EPR command to a value equal to or less than the limit EPR to assure automatic control below or at limit values. Moreover, when the pilot requires maximum limit thrust as indicated by movement of the throttle to the stops, logic implementation represented by the logic switch 68 replaces the voter command with a limit command (EPR limit) until the throttle is moved away from the stops. The logic switch 68 is required for maximum limit thrust dictated by the pilot's initiation of the switch 68, otherwise the control system of this invention may attempt to control a manual throttle input or boost to levels less than the maximum value, as explained herein, as an overboost protection. The net EPR feedback error signal for the control system 10 of this invention is formed at the summing junction 64 for engine 12 and similar summing junctions corresponding to the remaining engines of a multi-engine aircraft represented by th signals provided on lines 58$_b$, 58$_c$ and 58$_d$ would similarly be provided for the respective engines. Branching circuit 70 and EPR loop 72, EPR rate loops 74 and 76 are coupled to the summing junction 64 and are combined with the target EPR command signal provided by the voter 60. The net EPR feedback error signal of an engine is provided, as illustrated in FIG. 2, by summing the target EPR command signal from the voter 60 with the complemented EPR signal of the respective engine and with the particular EPR rate provided by loops 74 and 76. Again, it is noted that the branching circuit 70 and the loops 72, 74 and 76 are illustrated for the particular engine 12 shown in the drawings and identical branching circuit and respective loops would be provided for the three remaining engines which are represented by the lines 58$_b$ to 58$_d$. The EPR rate loop 74 includes a summing junction 80 to which are coupled the complemented EPR signal of engine 12 via branching circuit 70 and the target EPR command from the voter 60. The summing junction 80 couples the difference or error between the target EPR of the voter 60 and the complemented EPR of the particular engine 12 to a rate circuit 82 to provide the EPR error rate of the particular engine 12 to its respective summing junction 64. It is noted that the summing junction 80 of each respective engine formulates the EPR error for the respective engine control loop. EPR rate loop 76, however, formulates the EPR rate rather than EPR error rate as illustrated in loop 74 by coupling the complemented EPR signal of the particular engine 12 to a rate circuit 83, similar to the rate circuit 82, for combining in the summing junction 64. A logic switch 78 couples either the EPR error rate loop 74 or the EPR rate loop 76 to the summing junction 64 in accordance with the mode of operation of the system. That is, during non-trim modes of operation, for example, take-off and reverse thrust, the loop damping is provided by the EPR rate of rate loop 76, and therefore switch 78 is coupled thereto. In the trim mode of operation, however, the EPR error rate of loop 74 must be used, as EPR rate alone would be unacceptable for this mode of operation because the rate would oppose the voter command changes which are introduced by pilot throttle input commands. Therefore, the net EPR feedback error signal provided by summing junction 64 results from the summation of the complemented EPR signal of the respective engine via line 72, the EPR rate signal of loop 74 or 76 depending on the mode of operation as above discussed, and the target EPR command of the voter 60. The net EPR feedback error signal formed by the summing junction is coupled via line 84 to the respective actuator 16 of the engine 12. In accordance with this invention, therefore, the engine status indicator signal or characteristic, EPR, of each engine of a multi-engine aircraft is summed with the target value of that characteristic formulated by the voter 60 to provide an EPR feedback error signal to the respective engines to trim all the engines of the aircraft to the same value, i.e., to form a convergent control condition free of cross coupling. The respective EPR feedback error signals are coupled to the respective engines via line 84, circuit means 86 and switch 88, wherein circuit means 86 and switch 88 are logic controlled for the particular mode of operation of the system, e.g., take-off or reverse thrust as set by the pilot (and as illustrated in FIG. 2). Specifically, circuit means 86 is represented by a $-1$ gain, for the reverse thrust mode of operation, to transpose the EPR feedback to command a decrease throttle for increased thrust in this reverse thrust operation, otherwise, circuit means 86 may be represented by a $+1$ gain to pass the signal from junction 64 to the actuator 16. Furthermore, the logic switch 88 does not couple the EPR feedback signal to the actuator in the take-off or reverse thrust conditions prior to initiating the closed loop capture of the command values.

In order to provide the throttle control system 10 of this invention with an overboost protection, the EPR feedback error signal of each engine in coupled to respective overboost protective circuit means 30 which generate a predictive signal to back-off the respective automatic throttle control position actuator (actuator 16 for engine 12 illustrated in the figure,) in response to a pilot initiated manual throttle overboost of the engines. For the engine 12 illustrated in the figure, circuit means 30 includes rate circuit loop 89 and CSA predictive loop 90. The rate circuit loop 89 comprises a summing junction 91 having inputs from the potentiometer 42 and from a linear voltage transducer LVDT 92. The linear voltage transducer 92 is coupled to the output of the automatic throttle actuator 16 of the respective engine 12 and in this embodiment the motion of the LVDT is opposite that of the linear actuator 16 such that the output of the summing junction 91 is essentially the output of the manual throttle 14 input by the pilot. Thus, the summing junction 91 results in no change in the signal therefrom when an engine trim input occurs, but all manual throttle inputs result in a change in the signal level from the summing junction 91. The output of the summing junction 91 is coupled via line 94 to a washout circuit 96 to provide the rate of the manual CSA input. The washout circuit 96 has its output coupled to a positive value limiter 98 to insure that only positive thrust command values will be processed. The limiter 98 is coupled to a scaling circuit 100 to match integration scaling of the feedback signals so as to produce a one for one change at the integrator output for each degree of excess input at the summing junction 91. A logic switch 102 couples the output of the rate circuit loop 89, that is, the predictive terms thereof to a summing junction 104. The summing junction 104 also includes an input from the net EPR feedback error signal coupled from the summing junction 64 through a gain programmer 105 responsive to total air temperature and EPR. The gain programmer utilizes the slope data of the engine characteristics illustrated in FIG. 3 to maintain the over-all loop gain at a constant value throughout the operating envelope of the engine, from high to low temperature, as the stability of the control loop is highly affected by the range in gain that the basic engine exhibits. The feedback and predictive terms summed or combined in the summing junction 104 form the input to an integrator 106 to provide a steady state reference for the trim actuator position loop. The CSA predictor loop 90 includes a CSA limit predictor 108, having inputs including EPR limit of the particular engine characteristic and total air temperature, to develop the maximum expected CSA, as determined by the engine characteristics illustrated in FIG. 3 and produced in tabular form in the predictor 108. In addition, the CSA predictor loop 90 includes a summing junction 110 wherein a constant represented by 79.5 for the particular engine of this embodiment is summed with the CSA limit predictor signal. That is, the predictor 108 signal is subtracted from the equivalent throttle maximum forward stop and the zero reference of the actuator LVDT position which in this example is 84 (the maximum forward position) −4.5 (the mid value of the actuator travel) which equals 79.5. The predictor signal from the summing junction 110 is coupled to a scaling circuit 112 wherein the predicted signal is converted to appropriate values, in this embodiment inches of actuator movement. The CSA predictor circuit loop 90 is coupled to the integrator 106 via a logic switch 114 for the conditions of take-off or reverse precapture modes of operation and presets an initial condition or value on the integrator output as a predictive control technique for this mode of operation. Thus, an overboost protection of the throttle control system 10 is provided by loops 89 and 90 in the following manner. When the CSA limit predictor 108 indicates that excessive throttle input has been applied by the pilot, logic switch 102 couples the rate circuit loop 89 to the summing junction 104 to provide predictive terms to the integrator 106 to backoff the actuator accordingly. In addition, if the aircraft is in a take-off or reverse mode of operation, logic switch 114 couples the CSA predictor loop 90 to the integrator 106 such that the initial condition set on the integrator will be summed as described herein to command the actuator position.

The combination of the predictive terms and the EPR feedback terms integrated in the integrator 106 are coupled to a summing junction 116 where they are combined with the net EPR feedback error from the summing junction 64 coupled through branching circuit 118 and a displacement gain circuit 120. Thus, the net actuator position command is summed at the summing junction 116 and comprises the sum of the displacement (net EPR feedback error) and integral (integrator 106 output) terms.

The net actuator position command of summing junction 116 is coupled via line 122 to the automatic throttle position control actuator feedback loop on servo loop 32 via a summing amplifier 124. The servo loop further includes a deadzone circuit 126, to minimize servo jitter about null conditions, and a power amplifier 128 to convert the low level pulse train into a fixed voltage pulse with variable outputs, extend (EXT) or retract (RET), suitable to drive the actuator 16 in the appropriate direction. The servo amplifier loop 32 further includes a displacement loop 130 and a rate feedback loop 132 including LVDT 92 coupled to the output of the actuator 16 and having its output coupled to the displacement and rate feedback loops 130, 132. The rate feedback loop 132 includes a washout circuit 134 and the output thereof is coupled to a summing junction 136 whose other input is coupled to the displacement loop. The summing junction 136 combines the displacement and rate signals of the servo loop 32 and couples the summed signal to the summing amplifier 124 in typical feedback fashion such that the net servo command of the servo loop 32 is the sum of the net actuator position command from the summing junction 116 and the shaped LVDT feedback of the servo loop 32. The net servo command is coupled to the actuator 16, which in this application was an adaptation of a linear actuator normally used as an aileron trim actuator. As indicated above, automatic throttle trim actuator 16 position is sensed by an LVDT 92 located at the end of the actuator shaft and, as previously indicated, the LVDT motion is opposite that of the linear actuator. The a.c. output of the LVDT 92 is demodulated by demodulator means 138 and scaled to the proper acceptance range of the analog electronics. As indicated above, the basic servo feedback signal is the LVDT position of the displacement loop 130 and rate compensation of the servo position loop is provided by rate loop 132 by taking rates of the position feedback by means of the washout circuit 134. It is noted that one skilled in the art may use a tachometer to obtain the preferred rate feedback signal.

Referring now to FIGS. 1A and 1B wherein the computational block diagram of the preferred embodiment of this invention is disclosed, and wherein like numerals refer to like elements of FIG. 2, the apparatus of this invention includes a plurality of computational blocks that may be instrumented by any of a variety of well-known devices such as the analog circuits of FIG. 2 or by special purpose discrete digital circuits or may alternatively be implemented by a general purpose digital or analog computation apparatus. Accordingly, the loop means 26 (FIG. 1B) and more specifically the complementary filter 27 (FIG. 1B) is coupled to the engine 12, represented by the engine EPR vs. CSA gain circuit 150 (FIG. 1A) and the engine dynamic circuit 152, which are indicative of the particular engine characteristics of the particular engines to be controlled. The engine status indicator signals, EPR, are provided by the EPR sensor 34' as two synchro outputs ($V_{XZ}$ and $V_{YZ}$) of the EPR signal. The EPR synchro outputs are coupled to appropriate memory circuit means 154 (FIG. 1B) via conventional demodulator circuits 156a and 156b (FIG. 1A), respectively, analog multiplexer means 158, analog-to-digital converter means 160, and interface means 162 coupled to the memory circuit 154. It is noted that the horizontal arrows into the blocks 154 and 162 of FIGS. 1B and 1A, respectively, connect to form one arrow denoting bi-directional data flow between the blocks 154 and 162. The analog multiplexer means 158 provides a means of switching one input at a time to the analog-to-digital converter means 160, and the interface means 162 provides a memory address to the data being transferred to the memory 154 and decodes the address of the output data therefrom as well as sets up the proper output signal switching. In addition, the potentiometer 42 (FIG. 1A) coupled to the output of the summing junction 22 is also coupled via an appropriate buffer amplifier 166 to the memory 154 via the interface 162, the A/D converter 160 and the analog multiplexer 158. Accordingly, the complementary filter means 27 provides a complemented EPR signal as indicated in FIG. 2 for a particular engine as follows. The EPR of a particular engine provided by the sensor 34' is transferred from the memory 154 to the summing junction 40 (FIG. 1B) via line 38 in digital format. The engine 12 throttle position (CSA) provided by the potentiometer 42 is coupled from the memory 154 to the summing junction 44 also, in digital format, wherein the bias signal 46 equal to 32°, in digital format, is coupled to the other input of the summing junction 44 with the polarity as shown, as described in connection with FIG. 2. In this embodiment of the invention, the signals of the circuit of FIG. 1B are in digital format and will not be repeated hereinafter. The bias signal 46 is provided, as previously explained, because the EPR versus cross shaft angle (CSA) relationship of this particular engine, as shown in FIG. 3, varies not only with altitude and temperature but also with cross shaft angle position and includes a deadzone approximately having a range from 22° to 42° cross shaft angle. Accordingly, in order to account for both the reverse and forward thrust positions and the deadzone, absolute value circuit 48 and the deadzone circuit 50 as well as the bias 46 are provided in the complementary filter 27, to account for the little or no change in the deadzone region and the reversal of EPR versus CSA slope for reverse and forward thrust conditions. Thus, the engine throttle control CSA, having been compensated for the deadzone and change in slope, is coupled to the washout circuit 52, wherein for the particular engine and the throttle control system of this invention a one second washout was applied to the rate to provide higher frequency complements in the area where the engine was introducing a lag signal. The initial condition equal to zero 53 (FIG. 1B) on the washout circuit 52, as indicated on the drawing, is coupled to appropriate logic means to account for the condition wherein the mode of operation of the system is either in take-off or reverse precapture. The initial condition equal to zero 53 indicates that the washout is in "fast" follow-up with no forward gain for this mode of operation. In order to convert the throttle control CSA rate to an EPR signal, gain programmer 54 utilizes the data of the curves illustrated in FIG. 3 to convert from cross shaft angle position to EPR. In this embodiment, the data of FIG. 3 may be produced in tabular format and stored in the gain programmer 54 for use. Accordingly, the gain programmer coupled to the washout circuit 52 also includes an EPR average signal from the voter 60 discussed above and a total air temperature input to retain a compatible relationship with the commanded EPR and the relationship of EPR with temperature, as illustrated in FIG. 3. The modified derived EPR signal from the gain programmer 54 provides a lead compensated EPR term which is coupled to the summing junction 40 wherein it is summed with the engine EPR signal to provide a complemented filtered signal or complemented EPR signal on line 58$_a$, as indicated above. The complemented EPR signal, being the result of the sensed engine EPR signal from sensor circuit 34' and the modified derived EPR rate signal derived from the cross shaft angle data, is the primary engine feedback term to be coupled to the actuator 16. Furthermore, because of the addition of the modified derived EPR rate term, the complemented signal provides the basis for a control loop which is stable over a wide range of engine and sensor dynamics.

The auto throttle trim control system 10 of this invention also includes the trimming circuit means 28 described hereinabove wherein each of the complemented EPR signals of the respective engines of the four engine aircraft illustrated herein are coupled via appropriate line 58$_a$, 58$_b$, 58$_c$ and 58$_d$ to respective summing junctions 64, only one being illustrated for engine 12, which provides the net EPR feedback terms for the respective engines. Specifically, the individual respective engines provide an associated EPR term via similar lines 70 and 72 to the respective summing junction 64 of the associated engine and an EPR rate term via loops 74 or 76 depending on the mode of operation of the system, as explained above. For example, in a take-off or reverse thrust mode the switch 78 is coupled to loop 76 and EPR rate circuit 83; however, in all other modes of operation the switch 78 is coupled to loop 74 and EPR error rate circuit 82 wherein the difference between a commanded EPR signal and the individual respective engine signal provide an EPR error signal to the rate circuit, as previously indicated. In addition, the target EPR commanded signal is also coupled to the summing junction 64. The target commanded EPR signal is formed by means of the voter 60, described above, to which is coupled the complemented EPR signals from each of the respective engines. The voter 60 discards the highest and lowest EPR signals and takes the mid value of the remaining two complemented EPR signals. Furthermore, in the event that all of the complemented EPR signals are identical, the voter 60 discards the first and last signal and takes a mid value of the remaining two such that all conditions are accounted for. The target EPR commanded signal from the voter 60 is coupled to the limiter circuit 66 which provides a means of limiting the EPR commanded to a value equal to or less than the limit EPR for the particular altitude and temperature conditions. In the event that the maximum limit is required appropriate logic switches the limit switch 68 to the EPR limit for that particular altitude and temperature condition. Accordingly, each respective summing junction 64 for each respective engine combines the individual complemented EPR and EPR rate of the respective engine with the target EPR command from the voter 60 to provide a net EPR error feedback term for the respective engine along line 84. Circuit means 86 coupled thereto provides appropriate logic means for reverse thrust conditions.

In order to provide for an overboost prediction, means 30 coupled to line 84 provides prediction means to be coupled thereto to adjust the respective automatic throttle position control actuators accordingly. Specifically, loop means 89 responsive to the CSA of potentiometer 42 and the actuator position of the LVDT 92 via a scaling circuit 168 are coupled to summing junction 91 to provide the manual throttle input along line 94 to the washout circuit 96. In this manner, a predicted signal is provided such that an engine trim position command, which automatically senses the amount of excess power manual throttle input, is generated to adjust the control law steady state conditions and to overcome this excess without requiring an EPR overshoot. Specifically, the washout 96 is coupled to a limiter 98 which limits the signal from the washout circuit to positive values only to provide the predicted signal. The predicted signal from the washout and limiter circuit is coupled to a scale factor circuit 100 for integrator scaling. Logic switch means 102 couples the predictor value to the summing junction 104 to apply appropriate backoff terms to the respective actuator to prevent overboost of the respective engine. In the event that the predictor indicates there is no overboost, the logic switch 102 is switched to the no backoff position shown in the figure. The summing junction 104 combines the feedback EPR terms and the predictive terms of loop 89 to form an input to the integrator 106 to provide a steady state reference for the trim actuator position loop. For flight conditions other than takeoff or reverse precapture, the net EPR feedback terms of line 84 are coupled through the logic switch 88 to the gain programmer 105 which accommodates for changes in the EPR versus cross shaft angle for the operating envelope of the engine, from high to low temperatures, to maintain the over-all loop gain at a constant value throughout the operational envelope. In addition, branching circuit 118 couples the net EPR feedback term via a gain circuit 120 to the summing junction 116 wherein the integrated feedback and predictive terms are combined with the net EPR feedback term to provide the net actuator position command along line 122 to the servo amplifier 124. In this preferred embodiment of the invention, voltage compensation circuit 123 is provided such that the net actuator position command may be summed with the LVDT 92 and be insensitive to line voltage variations.

For the mode of operation, including take-off or reverse thrust, logic switches 78 and 88 are switched accordingly and logic switch 114 couples CSA predictor loop 90 to the integrator 106. The CSA loop 90 includes a cross shaft angle limit predictor 108 having inputs from the EPR limit of the particular engine and total air temperature to provide a preset value on the predicted initial condition input to the integrator 106. In addition, CSA loop 90 includes a summing junction 110 wherein the predicted value is subtracted from the equivalent maximum forward stop or zero LVDT position, i.e., 84–4.5 or 79.5 to generate the command in degrees. The scale factor 112 converts the LVDT command to the appropriate units (inches) and the switch 114 couples the predictor loop 90 to the integrator 106 during takeoff or reverse thrust. For all other conditions, the initial condition is preset on the integrator.

The integrator 106 output is coupled with the net EPR feedback error term and coupled through the memory 154 and the DMA interface 162 (FIG. 1A) to the servo loop 32. The digital output of the DMA interface 162 is coupled through a digital-to-analog converter 170 and converted therein to analog form suitable for use in the servo amplifier 124. In the preferred embodiment of the invention illustrated in FIGS. 1A and 1B, the servo command is extracted from the respective D/A converter 170, for the respective servo loop 32 for the particular engine 12 of the control sytem 10, and stored in a sample and hold circuit 171. The output of the D/A converter 170 is summed with the servo loop feedback terms in summing junction 172, the result being coupled to the summing amplifier 124, the deadzone circuit 126 and the pulse width power amplifier 128 to provide the necessary actuator command (EXT) or (RET) for the particular engine 12, automatic throttle position actuator 16. Coupled to the output of the actuator 16 is the LVDT 92 whose output is demodulated and scaled to the proper acceptance range of the electronics by the demodulator 138. The LVDT displacement feedback signal of loop 130 is coupled through a gain circuit 174 to the summing junction 136 to provide the primary actuator feedback term to the servo amplifier 124. Furthermore, rate circuit 132 is coupled to the output of the actuator LVDT 92 and, more specifically, to the demodulated signal thereof and includes the washout circuit 134 to provide rate compensation to the summing junction 136 of the actuator 16 servo loop 32.

Thus, in accordance with the invention, the engine control system is provided with a complemented engine characteristic signal by means of a modified derived characteristic rate signal summed with the engine characteristic signal to provide stability to the high gain control loop. The control system is provided with a convergence control condition free of cross coupling, that is, a stable trim system, by means of a voting scheme based on the complemented engine status indicator (EPR) or characteristic signal; and the control system is provided with an overboost protection by means of predictive circuits based on the engine status indicator EPR relationship with the throttle position (CSA).

While the invention has been described in its preferred embodiment, it is to be understood that the words which have been used are words of description rather than limitation and changes within the purview of the appended claims may be made without departing from the true scope and spirit of the invention in its broader aspects.

I claim:

1. Apparatus for controlling the throttle of a turbine engine including series coupled manual and automatic throttle position controllers comprising:
   means responsive to an operation characteristic of the engine for producing an engine status indicator signal,
   means responsive to the rate of change of the absolute value of the position of the throttle in excess of a predetermined deadzone position for deriving a lag compensation signal,
   means for combining said engine status indicator signal and said lag compensation signal for providing a lag compensated engine throttle control signal, and
   means for supplying said lag compensated engine throttle control signal to said automatic throttle position controller.

2. Apparatus for controlling the throttle of a turbine engine according to claim 1 wherein said means for deriving a lag compensation signal includes
   an absolute value detector responsive to the position of the throttle,
   a deadzone circuit coupled to the absolute value detector, and
   a washout circuit coupled to the deadzone circuit for providing rate compensation.

3. Apparatus for controlling the throttle of a turbine engine according to claim 2 wherein said means for deriving a lag compensation signal further includes gain programming means coupled to said washout circuit relating the engine status indicator signal to the operation characteristic and responsive to environmental temperature.

4. Apparatus for trimming the throttles of a multiple turbine engine aircraft, each engine including the throttle control apparatus as set forth in claim 1, said trim apparatus comprising:
voter means associated with said throttle control apparatus of each engine and responsive to said lag compensated signal of each engine control apparatus for providing a common lag compensated signal corresponding to the mid value of all of said lag compensated signals,
comparison means associated with said throttle control apparatus of each engine and each responsive to the said common mid value signal and the actual lag compensated signal of its associated throttle control apparatus for providing a control signal corresponding to the difference therebetween, and
means associated with the throttle control apparatus of each engine and responsive to its respective difference signal for controlling its respective automatic throttle position controller,
whereby each throttle of each engine is positioned to a common trim value.

5. The apparatus as set forth in claim 4 further including:
further means associated with the throttle control apparatus of each engine and responsive to the difference between said mid value signal and said lag compensated signal for deriving a signal proportional to the rate of change of said difference signal, and
means for further controlling each respective automatic throttle position controller in accordance with said rate signal.

6. The apparatus as set forth in claim 5 wherein the means responsive to the respective difference signal of each engine and the means responsive to the rate signal includes:
gain programming means responsive to environmental temperature to accommodate for changes in engine status indicator signal with the operation characteristic over the operating envelope of the engine.

7. The apparatus as set forth in claim 4 further including:
integrator means responsive to said difference signal for supplying an integral signal to said automatic throttle position controller.

8. The apparatus as set forth in claim 7 further including:
means responsive to the position of said throttle controller for providing a signal in accordance therewith,
means responsive to said throttle position signal for supplying a predictive signal proportional to the rate of change thereof for increasing values only, and
means for supplying said predictive signal to said integrator means.

9. The apparatus as set forth in claim 7 further including
means responsive to the operation of said manual throttle controller to a take-off thrust position for preconditioning said integrator means in accordance with a signal proportional to a predetermined throttle position limit as a function of said engine operation characteristic and environmental temperature.

* * * * *